United States Patent [19]

Felice et al.

[11] 4,179,614

[45] Dec. 18, 1979

[54] THERMOLUMINESCENT DOSIMETER SYSTEM

[75] Inventors: Patrick E. Felice, Hempfield Township, Allegheny County; Joseph L. Gonzalez, White Oak Borough; John G. Seidel, McCandless Township, Allegheny County, all of Pa.

[73] Assignee: Westinghouse Electric Corp., Pittsburgh, Pa.

[21] Appl. No.: 874,976

[22] Filed: Feb. 3, 1978

[51] Int. Cl.² .................. G01V 5/00; H05B 33/00; G01T 1/11
[52] U.S. Cl. .................................. 250/253; 250/484
[58] Field of Search .................. 250/253, 337, 484

[56] References Cited

U.S. PATENT DOCUMENTS

| | | | |
|---|---|---|---|
| 3,243,590 | 3/1966 | Forstman et al. | 250/484 |
| 3,471,699 | 10/1969 | McCall | 250/484 |
| 3,665,194 | 5/1972 | Alter et al. | 250/253 |
| 3,883,748 | 5/1975 | Nada et al. | 250/484 |
| 4,053,772 | 10/1977 | Felice | 250/484 |

*Primary Examiner*—Davis L. Willis
*Attorney, Agent, or Firm*—M. P. Lynch

[57] ABSTRACT

An improved thermoluminescent dosimeter system and apparatus for sensing alpha particle emission. A thermoluminescent body is sealed between a pair of metallized plastic films. The dosimeter is mounted within a protective inverted cup or a tube closed at one end, which is disposed in a test hole for exposure to radioactive radon gas which is indicative of uranium deposits.

8 Claims, 4 Drawing Figures

THERMOLUMINESCENT DOSIMETER SYSTEM

BACKGROUND OF THE INVENTION

The present invention relates to thermoluminescent alpha particle responsive dosimeters and apparatus which are useful for locating uranium deposits.

A thermoluminescent dosimeter is comprised of a phosphor material which after exposure to radiation such as alpha particles, will give off light or luminesce when heated to a characteristic temperature. The radiation causes some of the electrons of the phosphor material to be raised to an excited state where they remain trapped for an extended time unless the phosphor is heated to a characteristic temperature. Upon heating, the excited state electrons return to the ground state, giving off a pulse of light at a characteristic wavelength. The phosphor material may be formed as a compacted body or mixed and compacted with an inert carrier such as polytetrafluorethylene, as seen in U.S. Pat. No. 3,471,699.

A variety of phosphor materials are known which exhibit thermoluminescence, such as activated lithium and calcium fluorides, and calcium sulfate activated by dysprosium.

When a thermoluminescent dosimeter is made of a particular sensitivity by controlling its thickness, it can be used as taught by U.S. Pat. No. 4,053,772 in locating underground uranium deposits. The thermoluminescent dosimeter described in the aforementioned patent comprised a disk or body of phosphor and polytetrafluoroethylene which is "Teflon" a DuPont trademarked material. The dosimeter disk or body had a thickness of from about 5 to 18 mg/cm$^2$, and a thin aluminum layer surrounded the dosimeter disk. The aluminum layer was about 0.030 mil thick or about 0.8 micrometers to permit passage of alpha, beta and gamma radiation, and to act as a protective layer excluding moisture and dust. The dosimeter was disposed in an inverted cup placed in a test hole, so that alpha emissive radon gas (Radon-222), which percolates up through the ground activated the phosphor of the dosimeter. The dosimeter also detects alpha particles emitted by radon daughters. The dosimeters are collected and heated to permit a reading of the emitted light which is a function of the radon gas encountered.

The dosimeter was a very thin disk of about 1 to 3 mils thickness sandwiched between very thin 0.03 mil thick aluminum foil. This very thin aluminum foil is difficult to work with during manufacture and can be easily damaged during field use resulting in moisture or soil exposure to the dosimeter disk and degraded sensitivity. The thin aluminum foil was also used to prevent transmission of light and particularly the ultraviolet component from reaching the dosimeter, since ultraviolet radiation can cause the excited electrons to return to the ground state.

SUMMARY OF THE INVENTION

An improved thermoluminescent dosimeter system has been provided by disposing a thin dosimeter disk or body between metallized plastic layers which are sealed at their peripheries. The metallized surfaces preferably face the dosimeter disk. The metal layer on the plastic is very thin to be transmissive to alpha, beta and gamma radiation, as is the thin plastic layer which provides high tensile strength and is readily sealed to exclude moisture and soil. The thin metal layers are still effective to absorb ultraviolet radiation.

An improved apparatus is taught which is usable for detecting underground uranium deposits. The dosimeter is supported within an aperture provided in a mounting bracket within an inverted cup, with the metallized plastic films sealed to the mounting bracket, and the metallized plastic films are removably sealed at their peripheral edges to the mounting bracket.

DESCRIPTION OF THE PREFERRED EMBODIMENTS

The present invention can be best understood by reference to the exemplary embodiments seen in FIGS. 1-4.

Figure 1:
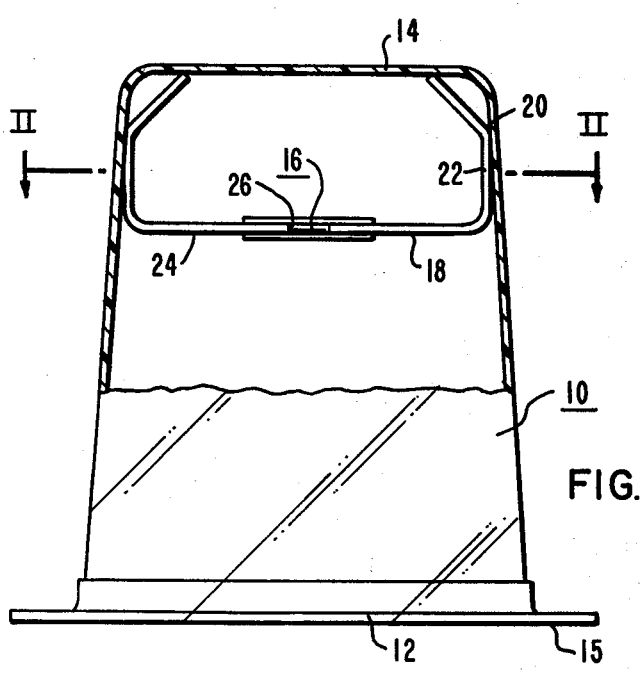
FIG. 1 is an elevational view of the inverted cup-shaped apparatus with the dosimeter system associated with a mounting bracket within the cup body.

In FIG. 1, an inverted plastic cup 10, has an open end 12 and a closed end 14. The open end is placed on the ground in a test hole. A stabilizing flange portion 15 may be provided at the open end 12 of the cup 10. A thermoluminescent dosimeter 16 is supported from generally U-shaped mounting bracket 18, also seen in FIG. 2. The U-shaped mounting bracket 18 is dimensional to slidably fit within the cup proximate the reduced diameter closed end portion 14. The mounting bracket may be retained in place by double-sided adhesive tape 20 provided between the upright arm portions 22 of the U-shaped bracket, and the interior surface of the side walls of the cup 10. The connecting portion 24 of the U-shaped bracket 18 has an aperture 26 therethrough. The bracket 18 is typically formed of thin sheet aluminum which is about 32 mils thick; and the aperture 26 by way of example is about 0.25 inch in diameter.

Figure 2:
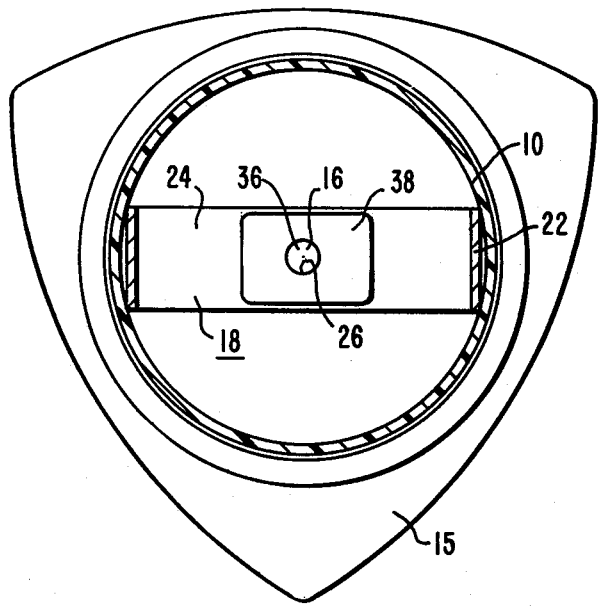
FIG. 2 is a plane view of the mounting bracket itself showing the dosimeter.
Figure 3:
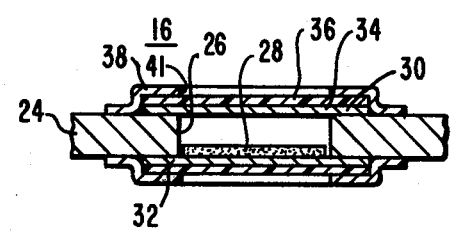
FIG. 3 is an enlarged cross-sectional representation of the dosimeter disposed in an aperture of the mounting bracket as seen in FIGS. 1 and 2.

As seen in greater detail in FIGS. 2 and 3, a thin thermoluminescent body or disk 28 is disposed within aperture 26. The body or disk 28 is very thin, about 1 to 3 mils thick. Upper and lower metallized plastic sheets 30, 32 are disposed on the upper and lower sides of the bracket 18 over the aperture 26, with the peripheral edges of the sheets 30 and 32 sealed to the bracket to provide a moisture and dust seal about the thermoluminescent body 28. The upper and lower metallized plastic sheets 30 and 32 are identical and comprise a very thin (300 Angstrom thick) aluminum layer 34, on a very thin (about 0.15 mil or 4 micrometers) high tensile strength plastic layer 36 of a polyester material such as "Mylar", which is a DuPont trademarked material. Such metallized polyester films are available from the King-Seeley Thermos Company of Winchester, Massachusetts.

The metallized plastic films 30 and 32 are disposed such that the aluminum layer 34 faces the bracket 18. The plastic layer 36 is then sealed to the bracket 18 at the plastic layer 36 periphery, by sealing means 38, which here is shown as adhesive-backed paper. An aperture 41 is provided through the paper 38 aligned with the bracket aperture 26. A variety of moisture and dust sealing means can be utilized to the periphery of the plastic layer and the bracket.

The metallized plastic films 30 and 32 can comprise a variety of metals and plastics such that the alpha particles emitted from Radon-222 and its daughters readily pass through these films. The alpha particles from Radon-222 and its daughters are at three different energies, i.e., 5.48, 6.00 and 7.68 MeV. The metal and the plastic must be selected with an alpha particle range and have a thickness which passes these alpha particles. The metal layer and thickness should be selected to be ultraviolet absorptive. The plastic should have good tensile strength for a thin layer or sheet.

The particular metal is selected to be ultraviolet absorptive in a relatively thin layer and to be of a density which permits alpha particles to pass therethrough. Aluminum is inexpensive and permits ease of fabrication, but other useable metals include copper, silver, and gold. It is preferable that the metal layer face the thermoluminescent body so that it is protected against deterioration by moisture or handling. The plastic surface being on the exterior serves to encapsulate the device, and the plastic is easily sealed at the periphery. The dosimeter system can have the metal layer on the other exterior side, with the plastic layer facing the thermoluminescent body.

The aluminum metal layer can be up to about 3000 angstroms thick and still be highly alpha particle transmissive, while the polyester plastic layer can be up to about 1 mil thick and still be highly alpha particle transmissive.

When the apparatus disclosed above is recovered from the field, the thermoluminescent body can be readily removed by stripping or peeling away one of the sealed metallized films from either side of the bracket, and the body separately heated to thermoluminesce. The body may then be replaced in the aperture and the metallized plastic film resealed to the bracket for repetitive field testing.

Figure 4:
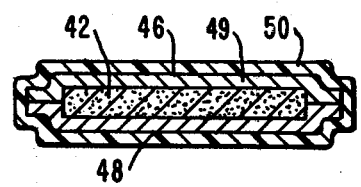
FIG. 4 is another embodiment dosimeter without the mounting bracket.

In another embodiment of the present invention seen in FIG. 4, a thermoluminescent body 42 is disposed between metallized plastic films 46 and 48 which are sealed at their peripheral edges about the body 42. Each metallized plastic film 46 and 48 includes a thin metal layer 49 and a plastic layer 50. The metal layer 49 preferably faces and is in contact with the thermoluminescent body 42. The metallized plastic films 44 and 46 can be the same films discussed above, such as the aluminum metallized polyester films as described above.

We claim:

1. An alpha particle responsive thermoluminescent dosimeter comprising,
a thin thermoluminescent body disposed between metallized plastic films having a metal layer on a plastic layer and which are transmissive to alpha, beta and gamma radiation, and wherein the metal layer of the film is non-transmissive to ultraviolet and light radiation, and the plastic layer of the metallized plastic film provides tensile strength, and the films are sealed at the periphery to provide a moisture and soil impermeable protective barrier.

2. The alpha particle responsive thermoluminescent dosimeter set forth in claim 1, wherein the metal layers of the films face the thermoluminescent body.

3. The alpha particle responsive thermoluminescent dosimeter set forth in claim 1, wherein the metallized films comprise a thin layer of aluminum upon a thin polyester film layer.

4. The alpha particle responsive thermoluminescent dosimeter set forth in claim 3, wherein the aluminum layer is about 300 Angstroms thick, and the polyester film layer is about 0.15 mil thick.

5. The alpha particle responsive thermoluminescent dosimeter set forth in claim 1, wherein the thermoluminescent body is disposed in an aperture provided in a mounting bracket which is disposed within an inverted gas collection cup, and the metallized plastic films are disposed on opposed sides of the mounting bracket over the aperture, and sealed at their periphery to the mounting bracket.

6. Apparatus for locating underground deposits of uranium by thermoluminescence produced by the alpha particle decay from radioactive radon gas and its daughter products comprising:
a cup-shaped body open at one end and closed at the other end, so that the open end can be placed upon the ground within a test bore hole;
a dosimeter support bracket disposed within the cup-shaped body and having an aperture through the bracket, including means for removably mounting the bracket to the cup-shaped body side walls;
a thin thermoluminescent body fitted within the aperture in the mounting bracket;
a pair of thin metallized plastic films which are transmissive to alpha, beta and gamma radiation disposed on opposed sides of the mounting bracket over the aperture within which the thermoluminescent body is disposed; and
peripheral seal means for retaining the metallized plastic films on opposed sides of the mounting bracket and for providing a moisture and soil impenetrable barrier.

7. The apparatus set forth in claim 6, wherein the metal layer of the metallized plastic films face the thermoluminescent body.

8. The apparatus set forth in claim 6, wherein the metal layer of the metallized plastic film is aluminum and up to about 3000 angstroms thick, and the plastic layer is polyester and is up to about 1.0 mil thick.

* * * * *